(12) United States Patent  
Emmons et al.

(10) Patent No.: US 6,685,254 B2
(45) Date of Patent: Feb. 3, 2004

(54) LOW FLOOR MASS TRANSIT VEHICLE

(76) Inventors: J. Bruce Emmons, 31695 Auburn Rd., Beverly Hills, MI (US) 48025; Leonard J. Blessing, 342 Linwood, Rochester, MI (US) 48307

( * ) Notice: Subject to any disclaimer, the term of this patent is extended or adjusted under 35 U.S.C. 154(b) by 0 days.

(21) Appl. No.: 10/144,099

(22) Filed: May 13, 2002

(65) Prior Publication Data

US 2003/0209922 A1 Nov. 13, 2003

(51) Int. Cl.[7] ............................................... B62D 25/00
(52) U.S. Cl. ............. 296/178; 296/203.01; 296/193.01; 296/210
(58) Field of Search .................. 296/1.1, 178, 181, 296/182, 185, 187, 193, 203.01, 204, 210, 187.01, 187.08, 193.01, 193.03, 193.04, 193.05, 193.07, 193.08, 193.09, 193.12

(56) References Cited

U.S. PATENT DOCUMENTS

| | | | |
|---|---|---|---|
| 3,881,765 A | | 5/1975 | Cerra et al. |
| 3,951,454 A | | 4/1976 | Tantlinger |
| 4,036,527 A | | 7/1977 | Faul |
| 4,059,303 A | * | 11/1977 | Mauri ........................ 296/187 |
| 4,158,465 A | | 6/1979 | Fenner et al. |
| 4,221,426 A | * | 9/1980 | Wardill ....................... 296/178 |
| 4,283,086 A | * | 8/1981 | Morin ........................ 296/178 |
| 4,358,914 A | | 11/1982 | Geyer |
| 4,425,001 A | | 1/1984 | Mauri |
| 4,426,114 A | | 1/1984 | Kehl et al. |
| 4,773,701 A | | 9/1988 | Messori |
| 5,056,848 A | | 10/1991 | Fekete et al. |
| 5,934,739 A | * | 8/1999 | Waldeck ..................... 296/178 |
| 6,237,989 B1 | * | 5/2001 | Ammerlaan et al. ......... 296/178 |
| 6,454,345 B1 | * | 9/2002 | Campus ................. 296/203.01 |

* cited by examiner

Primary Examiner—Stephen T. Gordon
Assistant Examiner—Patricia L. Engle
(74) Attorney, Agent, or Firm—Carlson, Gaskey & Olds

(57) ABSTRACT

A mass transit vehicle includes a frame structure that provides an efficient and economical approach to providing a low floor bus. The inventive frame includes a stiff roof panel and a stiff floor panel. A plurality of generally vertical pillars extend between the roof and floor panels. A unique bracket arrangement is disclosed for connecting the pillars to the panels. Side panels are secured to the pillars and carry the shear stresses on the frame. A unique seating assembly that can be advantageously incorporated into the vehicle taking advantage of the load distributing features of the inventive frame is also disclosed.

28 Claims, 10 Drawing Sheets

LOW FLOOR MASS TRANSIT VEHICLE

BACKGROUND OF THE INVENTION

This invention generally relates to mass transit vehicles. More particularly, this invention relates to a unique frame arrangement for a low floor mass transit vehicle.

Mass transit vehicles or buses are well known. There are a variety of configurations of such vehicles. Recently, the so-called low floor buses have become more desirable because of the easier access such vehicles provide to a variety of passengers. Because such buses have a lower profile, exiting or entering the bus is easier.

One approach to designing such buses is to essentially convert traditional bus style components into low floor bus components. Such a transition is not always successful, however, and tends to eliminate at least some of the advantages associated with a low floor bus design. Those skilled in the art are always striving to make improvements. For example, it is desirable to provide a lighter weight vehicle so that increased passenger capacity is available without exceeding legal weight limits. Additionally, more economical manufacturing techniques are desirable to increase the profitability for manufacturers of such vehicles.

This invention provides a unique mass transit vehicle frame that greatly simplifies the manufacturing process, presents substantial weight and cost savings and maximizes the benefits obtained by utilizing a low floor bus configuration.

SUMMARY OF THE INVENTION

In general terms, this invention is a frame for a mass transit vehicle. The inventive frame includes a stiff floor panel extending between a front and rear of the frame. A stiff roof panel is positioned above the floor panel. A plurality of pillars extend between the floor panel and the roof panel. The pillars are connected to the panels near ends of the pillars and near edges of the panels. A plurality of side panels are secured at least to the pillars such that the side panels carry shear stresses on the frame.

In one example, the roof and floor panels include a sandwich like construction having a first sheet and a second sheet with a reinforcing portion between the sheets and secured to them. The roof and floor panels in the preferred embodiment are stiff and strong in two directions. A first direction is lateral direction that extends generally across the frame from one side of the vehicle to the other. The second direction is a longitudinal direction from the front to the back of the vehicle.

Connecting brackets preferably are used to secure the pillars to the roof and floor panels. The connecting brackets in one example have a generally L-shaped configuration with a first support portion that is secured to the pillars and a second support portion secured to the corresponding panel. In one particular example where the roof and floor panels include two sheets, at least one of the bracket support portions is inserted between the two sheets of the panel and secured to a selected one of the sheets.

One example of the inventive arrangement also includes cantilevered seats mounted to the frame. In one example, the seats include front and rear cantilevered support members that are secured to corresponding ones of the pillars using mounting brackets. The mounting brackets have a butterfly-like configuration with a central portion secured to the seat and extending wing portions secured to a corresponding one of the pillars near ends of the wing portions.

One example embodiment of this invention includes a completely stainless steel frame. The various components of the frame in such an example are designed to accommodate spot welding most of the connections between the components.

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENTS

Figure 1:
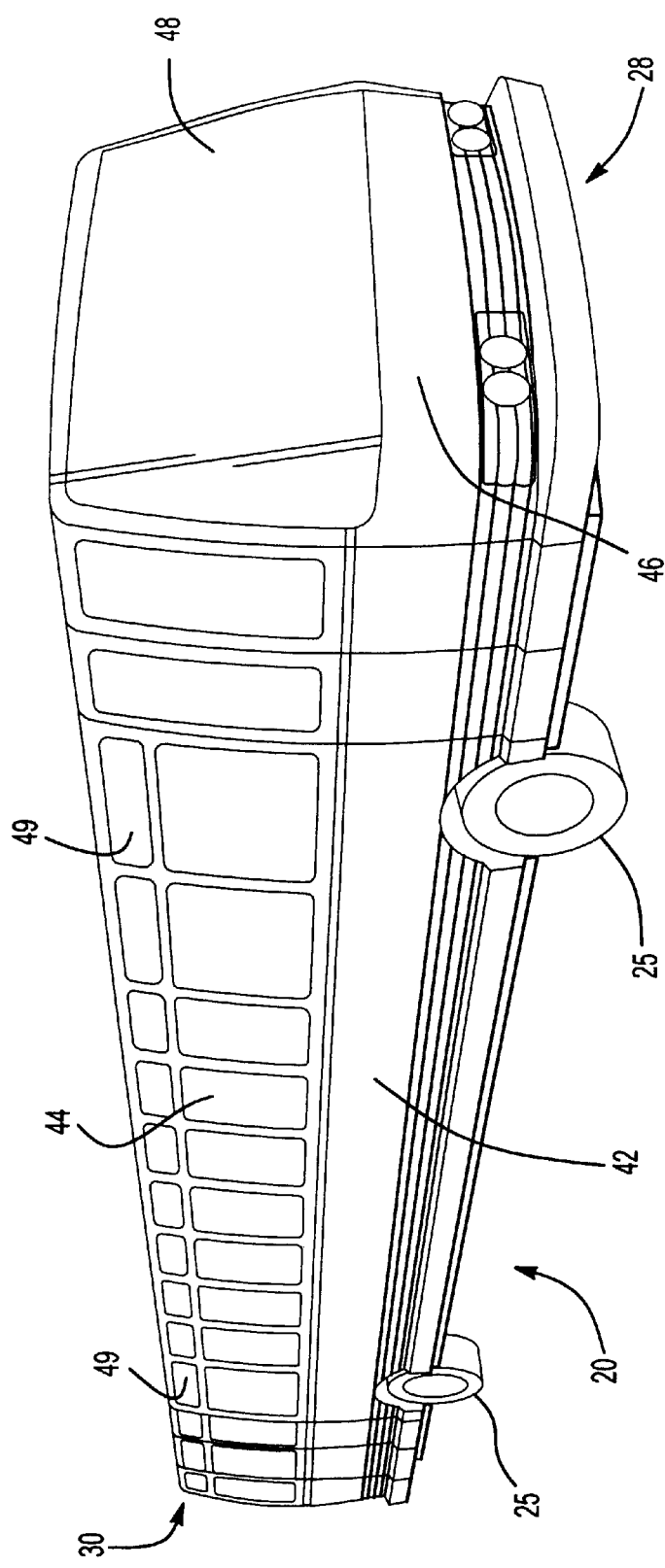
FIG. 1 diagrammatically illustrates a low floor mass transit vehicle designed according to this invention.

A mass transit vehicle 20 includes a frame having a stiff floor panel 22 and a stiff roof panel 24. The floor and roof panels in this example are stiff but, because of the overall length of each panel, are not completely self-supporting independent of the remaining frame members. When the frame is assembled, the roof and floor panels are stiff and strong enough to resist any bending loads on them. In the preferred embodiment, the roof and floor panels are stiff and strong in two directions; laterally (i.e., across the frame from one side to the other) and longitudinally (i.e., from front to back along the frame).

In one alternative example, the roof and floor panels are not both stiff and strong in both directions. One or both of the panels may be less stiff and strong in one direction compared to the other direction. In such a frame, the lateral stiffness preferably is the primary stiffness of the corresponding panel.

The roof panel 24 is generally planar. The roof panel 24 need not be completely flat but could include a slight curvature if desired for aesthetic reasons, for example. The floor panel 22 preferably is generally planar along the entire length of the floor panel. The floor panel 22 is interrupted at locations where the vehicle wheels 25 are received within wheel housings 26.

In the illustrated example, the wheel housings 26 each include a generally box-like structure having side panels 27A, 27B, 27C and 27D. The panels 27 preferably are made from a solid sheet of metal material and are welded together at the seams. At least one edge of the panels 27A, 27D and 27C are welded to the stiff floor panel 22.

The roof panel 24 and the floor panel 22 extend longitudinally between a front end 28 and a rear end 30 of the vehicle frame. Each panel preferably is made from a plurality of sections that each extend across the frame laterally and are joined together so that multiple sections collectively extend longitudinally from the front to the rear of the frame. Alternatively, the panels could be one continuous panel extending along the entire length.

The frame includes a plurality of generally vertically arranged pillars 32 extending between the floor panel 22 and the roof panel 24. The pillars 32 preferably are connected to the floor and roof panels at edges of the panels and near ends of the pillars. In the illustrated example, a generally horizontal front beam 34 and a generally horizontal rear beam 36 are incorporated into front and rear modules (see FIG. 4) that respectively extend between corresponding ones of the pillars 32 at the front and rear of the frame.

Figure 2:
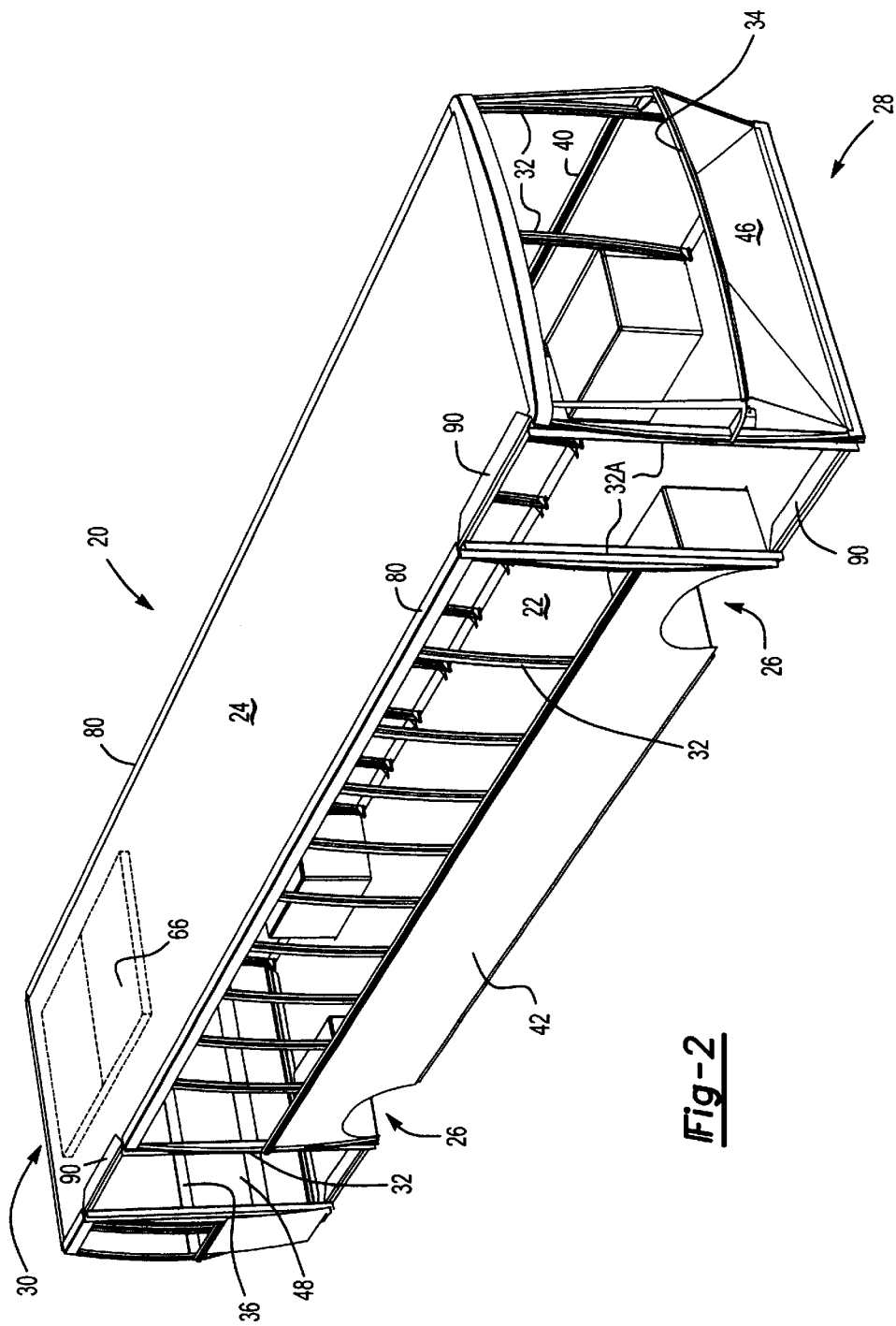
FIG. 2 is a schematic, perspective view of a frame designed according to this invention.
Figure 3:
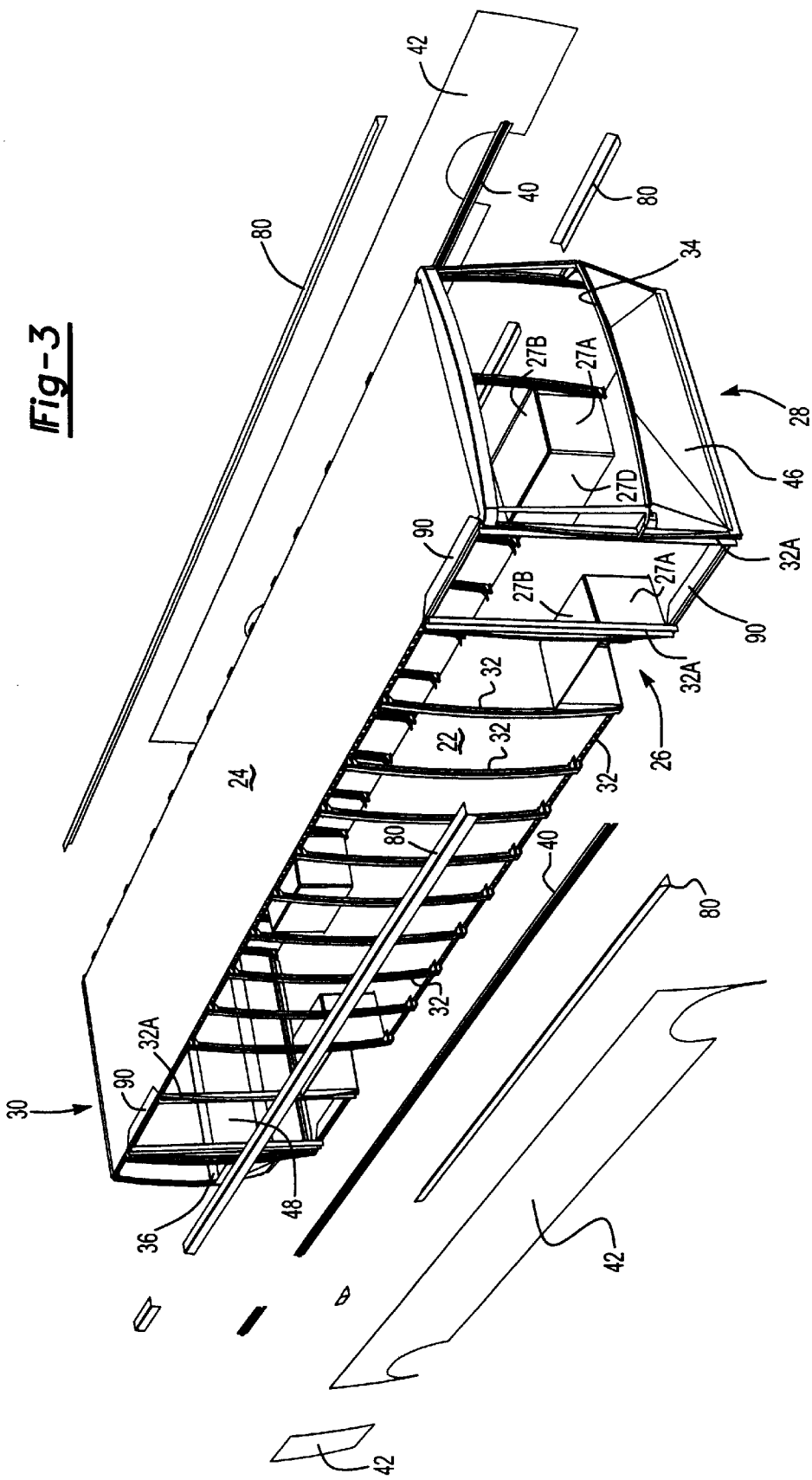
FIG. 3 is a partially exploded view of the frame of FIG. 2.

A horizontal reinforcement beam 40 (best seen in FIGS. 2 and 3) extends along each side of the frame and is secured to the pillars 32 at the interface between the beam 40 and each pillar. The horizontal reinforcement beam 40 provides an additional support for exterior side panels 42 on the sides of the frame. The side panels 42 carry shear loads on the frame. The horizontal reinforcement beam 40 also provides support for window panels 44 (FIG. 1) along each side of the frame. Some of the window panes 44 may be emergency exits. The illustrated example vehicle 20 also includes windows 49 which are selectively opened to provide ventilation as desired.

Body panels 46 and 48 are part of the modules at each end of the vehicle. The horizontal beam 34 also provides support for a front window panel 48 in the illustrated example.

The outer side panels 42 and the window panels 44 are attached to the pillars 32 to provide shear continuity to the sidewalls of the vehicle. The floor panel 22, roof panel 24, pillars 32 and side panels 42 and end panels provide the necessary stiffness to the overall frame and are the primary load bearing portions of the vehicle.

The pillars 32 in one example are generally equally spaced along the length of the vehicle frame. A pillar 32 preferably is placed at each side of the wheel housings 26 so that corresponding portions of the panels 27A and 27C can be welded to corresponding portions of the appropriate pillars. Such a connection allows for loads that are carried by the wheel housings 26 to be transferred to the pillars 32 for more effective load distribution.

In one example, the components of the frame including the roof and floor panels, the pillars, the support beams and the wheel housings all comprise stainless steel. An entirely stainless steel frame provides several advantages including the ability to weld the various portions of the frame together. In one example, many of the frame components preferably are designed to accommodate spot welding techniques for securing the components together.

As best appreciated in FIGS. 6–9, an example roof panel 24 has a sandwich-like construction with two sheets or flat members 50 and 52 and a reinforcing member 54 between the sheets. The reinforcing member 54 preferably has a generally corrugated configuration to provide economical reinforcement of the stiff panel. The reinforcing member can be roll-formed to provide the corrugations, which preferably extend laterally across the vehicle frame. In one example, the floor panel 22 has outer sheets 50 and 52 that each comprise stainless steel having a thickness of 0.050 inches and the reinforcing member 54 comprises a corrugated stainless steel sheet having a thickness of 0.030 inches. An example roof panel 24 has outer sheets with a 0.030 inch thickness. The greater thickness on the floor panel is to accommodate the additional weight supported by that panel under loaded conditions. One advantage of the sandwich-like construction of the floor panel is that it is possible to keep the total thickness of the floor structure as thin as possible. A thinner floor structure achieves the lowest possible step-up height while maintaining adequate ground clearance for the vehicle.

The roof structure 24 preferably is strong enough to support one or more components of the vehicle such as an HVAC system schematically illustrated at 66. The weight of such a component preferably is borne by the roof panel 24 and corresponding ones of the pillars 32 as the load from the component is distributed along portions of the frame. One advantage to the inventive arrangement is that it allows such components to be strategically mounted directly to the roof panel 24, for example.

Figure 8:
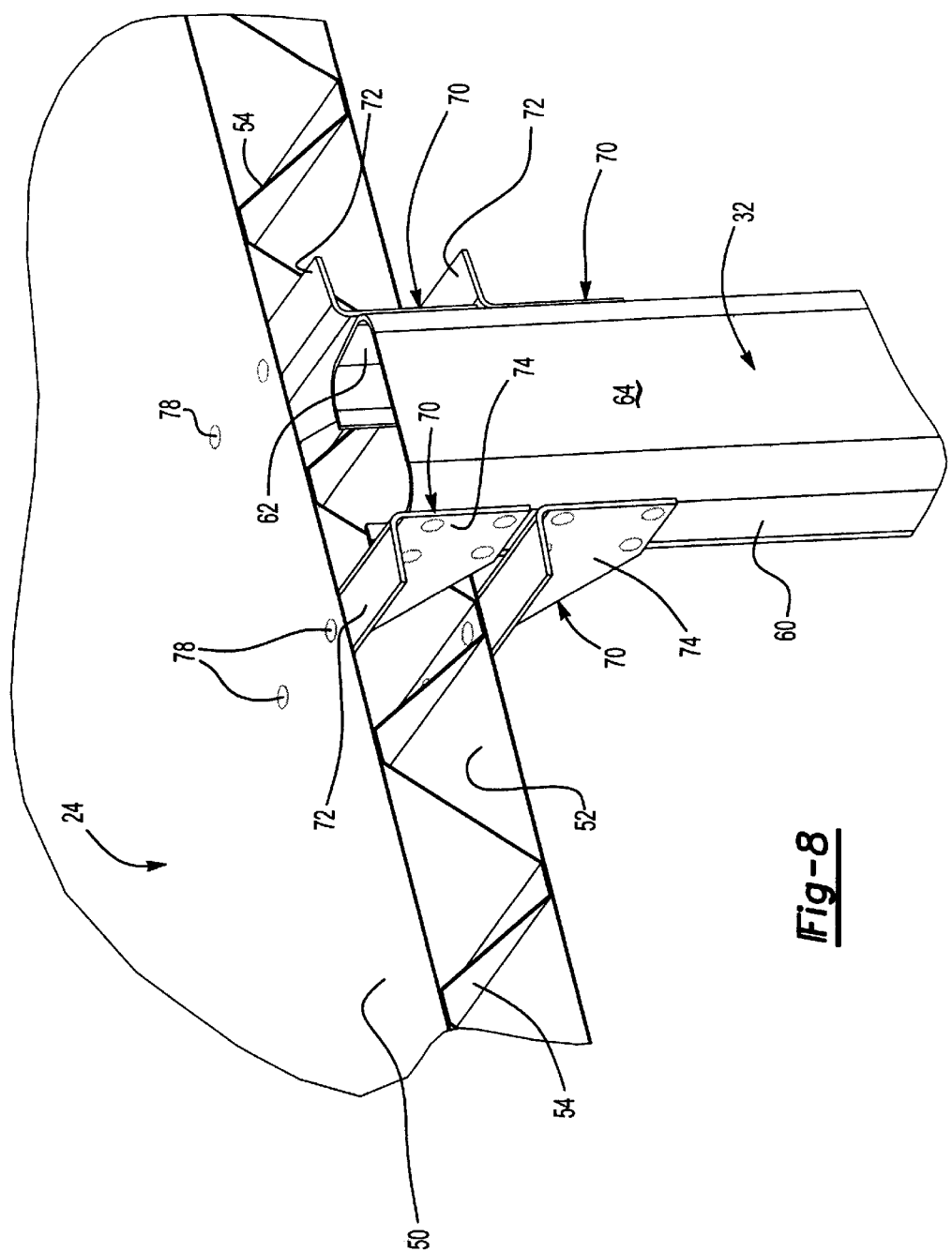
FIG. 8 is a perspective illustration of an example connection between a pillar and a roof panel in the frame of FIG. 2.
Figure 9:
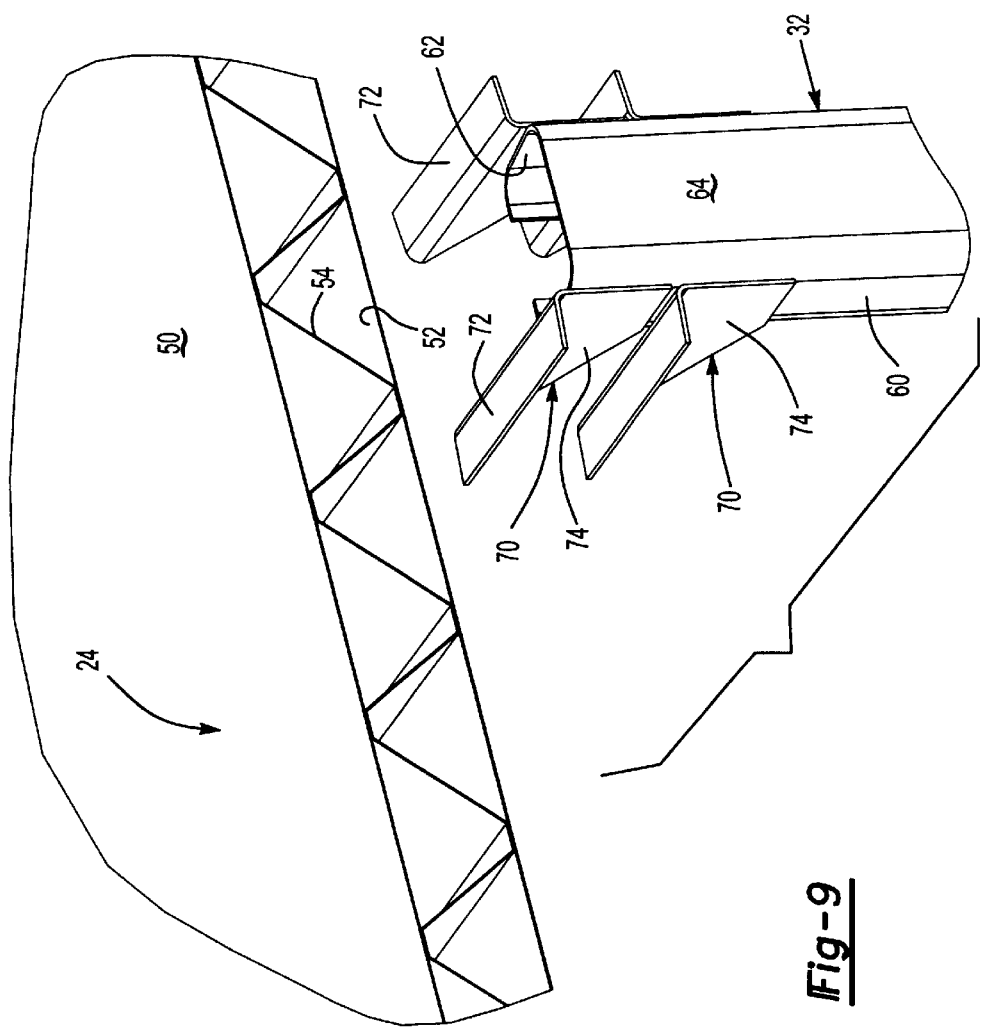
FIG. 9 is a view similar to FIG. 8 showing the components before the pillar is secured to the panel.

FIGS. 8 and 9 illustrate an example technique for connecting the pillars 32 to the panels 22 and 24. As can be appreciated from the drawings, the example pillars 32 have a constant channel-section. The example embodiment includes pillars that are readily roll-formed and include a continuous curvature. The pillars 32, while being generally vertically aligned may have a slight curvature to provide a desired side profile of the finished vehicle. In one example, the pillars 32 are spaced apart from each other along the length of the frame at intervals of approximately 28 inches. As will be described below, the pillars at such a spacing accommodate an inventive manner of providing seating within the vehicle.

The illustrated pillar 32 has two generally parallel sidewalls 60 and 62 with a third sidewall 64 integral with and extending between the other two sidewalls. A plurality of connector brackets 70 facilitate connecting the pillars 32 to the corresponding panels 22 and 24. While a connection between the roof panel 24 and an example pillar 32 is illustrated in FIG. 8, those skilled in the art will appreciate that a similar arrangement works well for connecting the pillars to the floor panel 22.

Each bracket 70 in the illustrated arrangement has a generally L-shaped cross section. A first support portion 72 is perpendicularly aligned with a second support portion 74. The support portion 72 of each bracket is adapted to be secured directly to the panel 24. In the illustrated example, four brackets 70 are used to make the connection between the pillar 32 and the roof panel 24. Each of the support portions 72 is secured to a corresponding one of the sheets 50 and 52. In the illustrated example, spot welds 78 secure the support portions 72 to the corresponding sheet. The support portions 74 preferably are spot welded to the sidewalls 60 or 62 of the pillar 32.

Such an arrangement provides a stable connection that, in combination with the lateral orientation of the corrugations in the reinforcing member 54, provides moment-carrying ability to the cross section. The inventive arrangement resists so-called lateral match-boxing and panel "breathing" along the mid-span of the bus.

The interfaces of the pillars 32 and the panels 22 and 24 are completed with corner reinforcement rails 80 that are connected, in one example, to the pillars and the panels. The corner reinforcement rails provide surface and sealing continuity between the side surfaces of the finished vehicle and the roof and floor panels.

The pillars 32 in one example are generally equally spaced along the length of the vehicle frame. A pillar 32 preferably is placed at each side of the wheel housings 26 so that corresponding portions of the panels 27A and 27C can be welded to corresponding portions of the appropriate pillars. Such a connection allows for loads that are carried by the wheel houses 26 to be transferred to the pillars 32 for more effective load distribution.

Figure 4:
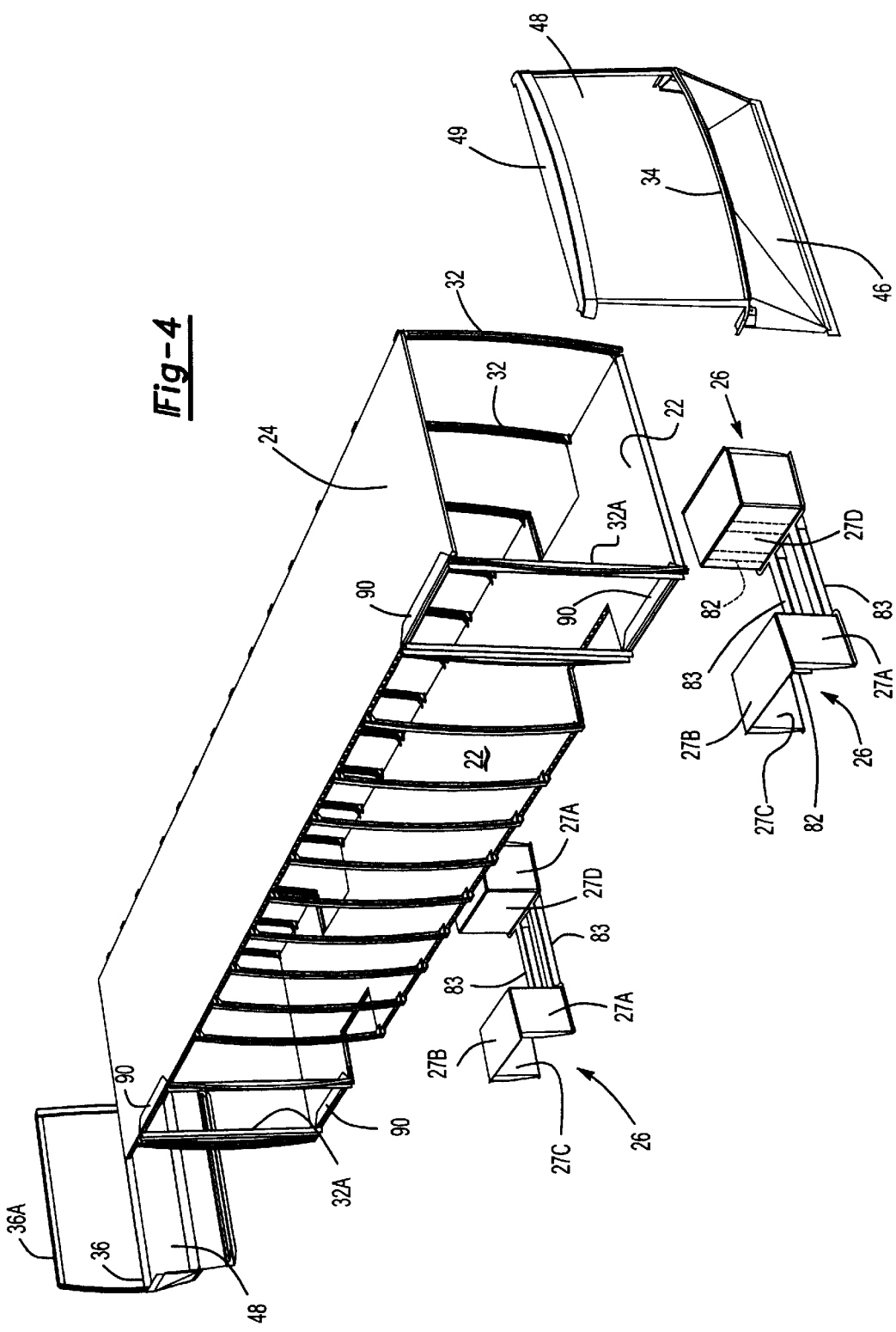
FIG. 4 schematically illustrates a partially exploded view of other selected portions of the embodiment of FIG. 2.
Figure 5:
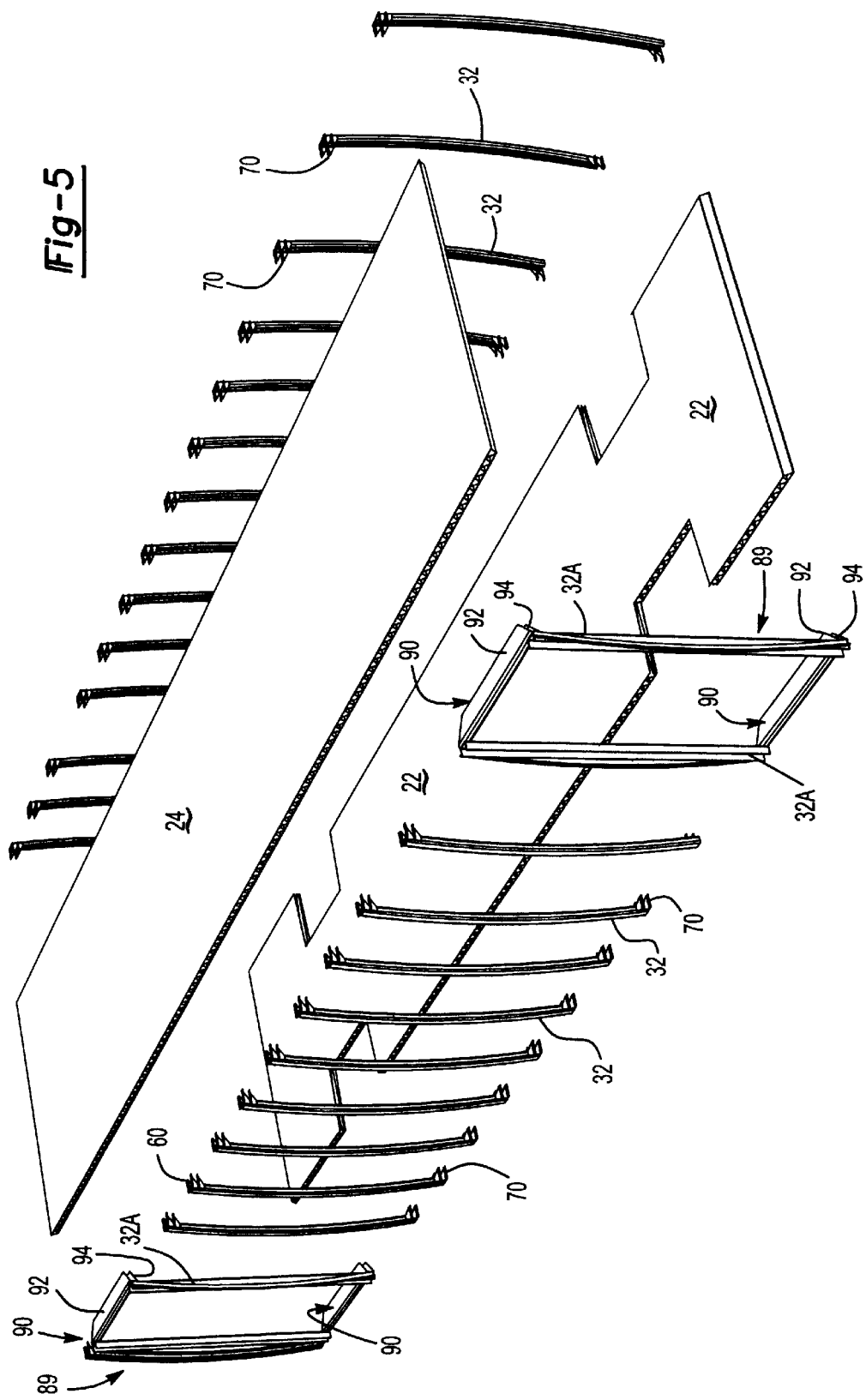
FIG. 5 is a partially exploded view of still other portions of the frame of FIG. 2.
Figure 6:
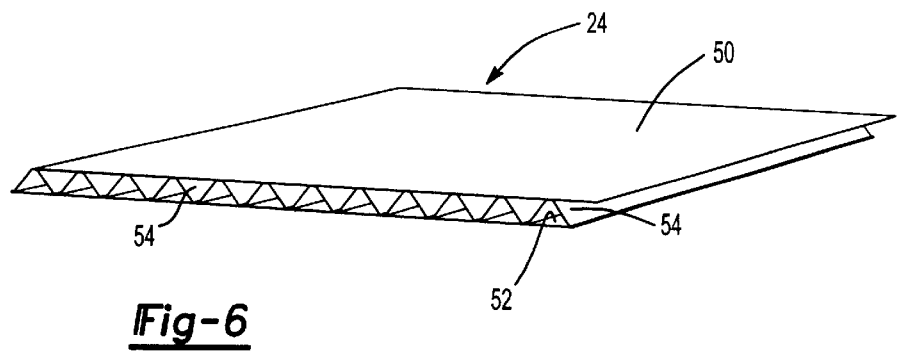
FIG. 6 schematically illustrates an example panel useful as a roof panel or a floor panel designed according to this invention.
Figure 7:
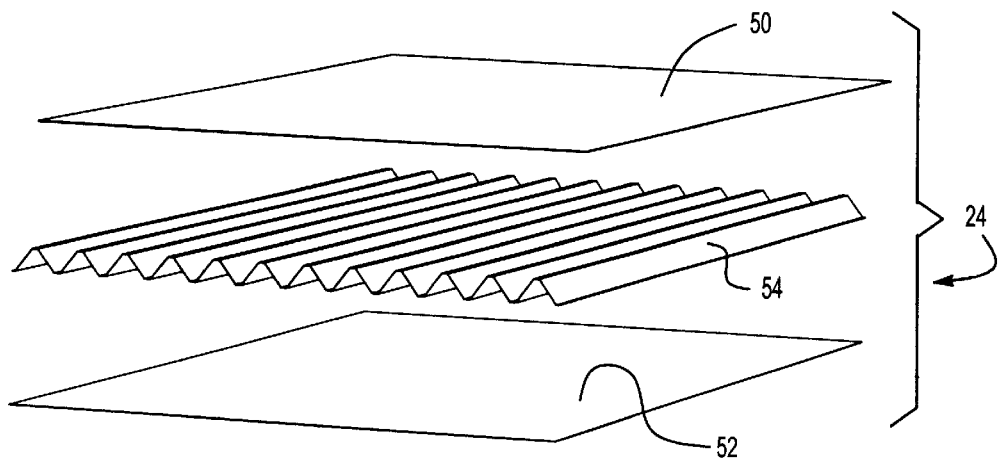
FIG. 7 is an exploded view of the panel of FIG. 6.
Figure 11:
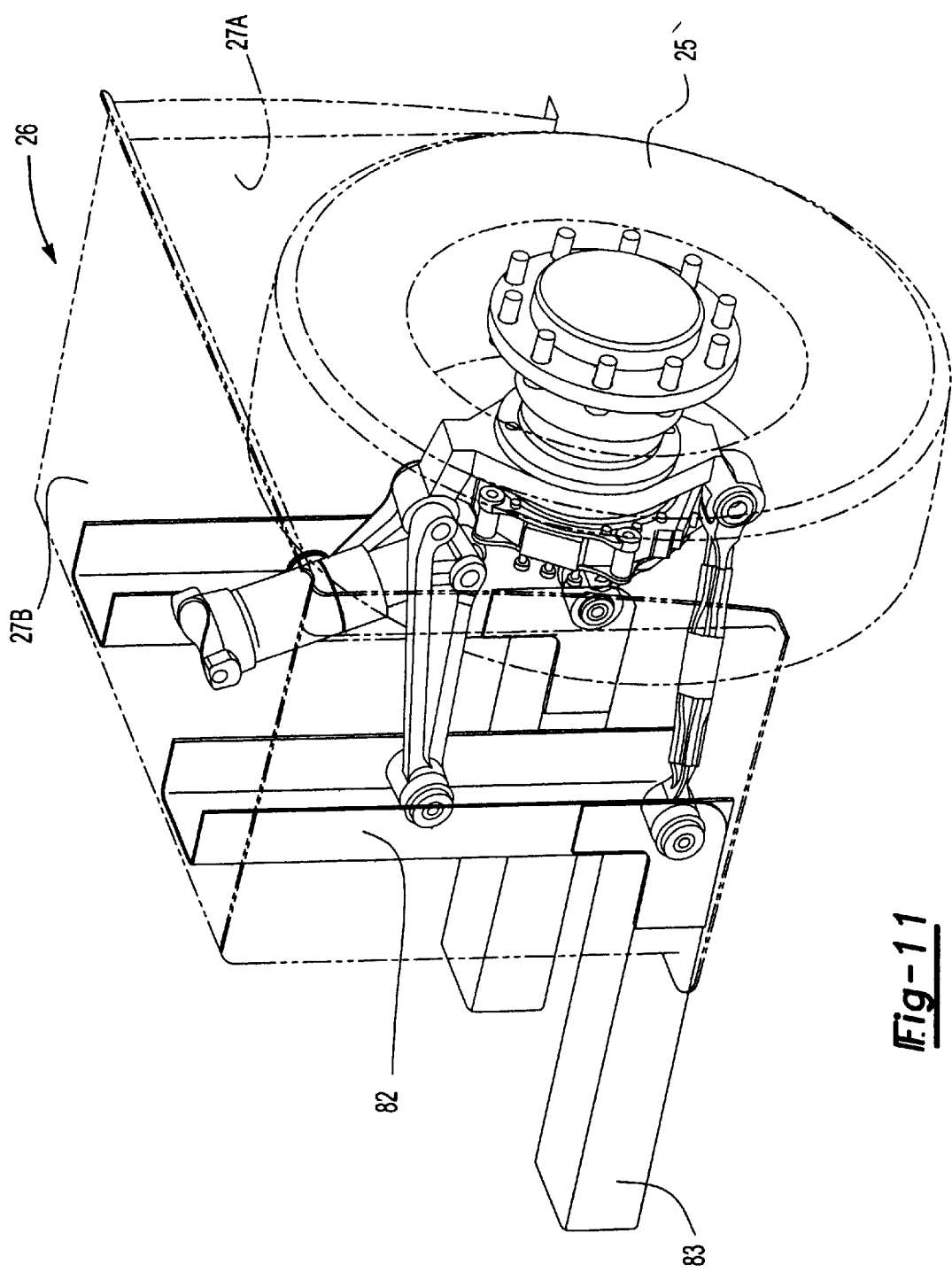
FIG. 11 schematically illustrates portions of a suspension mounting arrangement useful with the frame of FIG. 2.

FIGS. 4 and 11 best illustrate an example wheel housing arrangement including support channel members 82 that are secured to at least the portions 27D of the housing 26. The channel members 82 provide a secure connection point for appropriate portions of the vehicle suspension and facilitate distributing loads to the vehicle frame. The illustrated example also has lateral support tubes 83 extending between housings 26. The support tubes 83 in one example have a square cross section. The support tubes 83 facilitate making separate wheel housing modules that are eventually secured to the floor panel 22 and some of the pillars 32. The support tubes 83 further facilitate transferring loads on the vehicle suspension to the frame members.

The doors providing access to the bus interior for passengers in the illustrated example are included at the front and rear of the vehicle. Each door frame includes a structural hoop around the perimeter to provide diagonal stiffness across the openings. In the illustrated example, reinforcing channels 90 that comprise heavy gauge, channels with sidewalls 92 and 94 are received over a corresponding portion of the panels 22 or 24. The reinforcing members 90 can be considered a header and threshold portion of the structural hoop around the door opening. The sidewalls 92 and 94 preferably are welded to the outer sheets 50 and 52 of the panels 22 and 24. Pillars 32A preferably are provided on the side portions of the structural hoop around the door openings. In the illustrated example, the ends of the pillars 32A are welded directly to the header and threshold reinforcing members 90.

Figure 10:
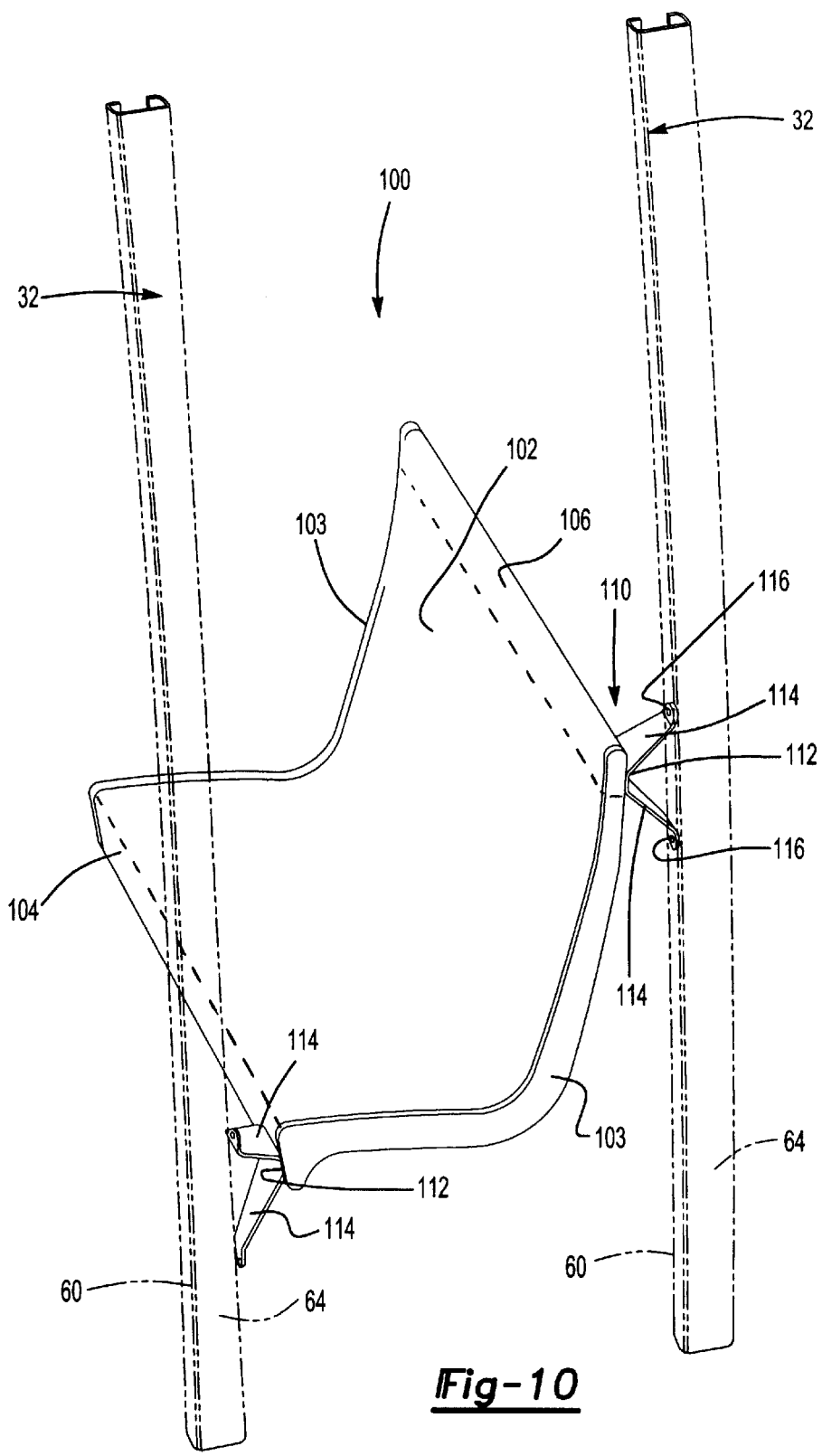
FIG. 10 schematically illustrates an example seat arrangement designed according to this invention.

FIG. 10 illustrates an example seat assembly that is useful with the inventive frame. The seat assembly 100 includes a seating surface 102, which in the illustrated example is a generally web-like surface made from a selected material. The seating surface 102 extends laterally between side edge members 103, a lower support beam 104 and an upper support beam 106. The support beams 104 and 106 preferably are hollow steel tubes. Seat support brackets 110 preferably facilitate connecting the upper and lower support beams 104 and 106 to corresponding ones of the pillars 32 such that the seat is cantilevered from the pillars 32. The illustrated example brackets 110 have a generally butterfly-like configuration with a central portion 112 that is adapted to be secured to the corresponding support beam 104 or 106. In one example, spot welding is used to make this connection. Support arms or wing portions 114 extend away from the central portion 112. The wing portions 114 preferably are bolted to the pillars 32 near ends 116 of the wing portions.

As can be appreciated from the illustration, the weight of the seat occupant is born by the upper and lower support beams 104 and 106 and the corresponding pillars 32. In the illustrated example, a front bracket 110 associated with the lower support beam 104 is secured to a sidewall 62 of one of the pillars 32. A rear support bracket 110 associated with the upper support beam 106 is secured to a sidewall 60 of an adjacent pillar 32. This arrangement of seats can be repeated along the length of the vehicle frame to provide as many seats as desired. Of course, the inventive vehicle arrangement accommodates other types of seating. The illustrated example is believed particularly advantageous because it utilizes the load carrying capacity of the pillars 32 and provides an economical mass efficient and convenient solution to providing seats within the vehicle.

The preceding description is exemplary rather than limiting in nature. A variety of changes or modifications could be made to the disclosed example. For example, materials other than stainless steel may be useful for one or more of the frame components. Other techniques for securing the various frame components together may also be used. Those skilled in the art who have the benefit of this description will realize what modifications can be made to meet the needs of their particular situation.

The scope of legal protection given to this invention can only be determined by studying the following claims.

We claim:

1. A mass transit vehicle frame, comprising:
    a stiff floor panel extending from a front to a rear of the frame;
    a stiff roof panel positioned above the floor panel and extending from one lateral edge to an opposite lateral edge of the frame and from the front to the rear of the frame;
    a plurality of pillars extending between the floor panel and the roof panel, the pillars being connected to the panels near ends of the pillars and near edges of the panels; and
    a plurality of side panels secured at least to the pillars, the side panels carrying shear loads on the frame.

2. The frame of claim 1, wherein the floor panel and the roof panel each are stiff and strong in at least a first direction extending laterally across the frame and in a second direction extending longitudinally between a front and a rear of the frame.

3. The frame of claim 1, wherein the floor panel and the roof panel each are stiff and strong in at least one direction extending laterally across the frame.

4. The frame of claim 1, wherein the floor panel includes a first sheet and a second sheet with a corrugated support portion between and secured to the sheets.

5. The frame of claim 1, wherein the roof panel includes a first sheet and a second sheet with a corrugated support portion between and secured to the sheets.

6. The frame of claim 1, wherein the floor panel, the roof panel and the pillars all comprise stainless steel.

7. The frame of claim 1, including connector brackets secured to the pillars near the ends of the pillars and secured to the corresponding floor or roof panel near the edge of the corresponding floor or roof panel.

8. The frame of claim 7, wherein the brackets each have a first support arm secured to the corresponding pillar and a second support arm generally perpendicular to the first support arm, the second support arm being secured to the corresponding panel.

9. The frame of claim 8, wherein the roof panel and the floor panel each include a sandwich construction of two outwardly facing sheets with a reinforcing member secured between the sheets and including at least four of the brackets associated with each end of the pillars, the second support arms of each bracket being secured to a corresponding one of the outwardly facing sheets.

10. The frame of claim 1, wherein the pillars are arranged parallel to each other and are spaced along a length of the frame at selected intervals.

11. The frame of claim 10, including passenger seats having a front support member secured to a first one of the pillars and a rear support member secured to a second one of the pillars adjacent the first pillar.

12. The frame of claim 11, including at least one support bracket having a central portion secured to at least one of the front or rear support members, the support bracket including two wing portions extending away from the central portion, the wing portions being secured to the corresponding pillar near the end of the wing portions.

13. The frame of claim 1, wherein at least the roof panel has at least one continuous, unbroken surface extending between the lateral edges and between the front and rear of the frame.

14. A method of making a frame for a mass transit vehicle, comprising the steps of:

positioning a stiff roof panel above a stiff floor panel, at least the roof panel extending from one lateral edge to an opposite lateral edge of the frame and extending from a front to a rear of the frame;

connecting a plurality of pillars to the roof panel and the floor panel near edges of the floor and roof panels and near ends of the pillars; and connecting a plurality of side panels to at least the pillars such that the side panels carry shear loads on the frame.

15. The method of claim 14, including constructing the roof panel and the floor panel, respectively, using a first sheet and a second sheet with a strengthening member between the sheets including attaching the sheets to the strengthening member at selected intervals.

16. The method of claim 15, including using at least one sheet for the roof panel that has a continuous, unbroken surface extending between a front edge and a rear edge of the frame and extending between opposite lateral edges of the frame.

17. The method of claim 14, wherein the panels and the pillars comprises stainless steel and including welding corresponding portions together to connect the pillars to the panels.

18. The method of claim 14, including securing mounting brackets to the pillars near the ends of the pillars and securing another portion of the brackets to the corresponding one of the floor or roof panels.

19. The method of claim 18, wherein the roof panel and the floor panel each comprise a sandwich construction having two sheets with a reinforcing member between the sheets and including inserting at least some of the other portion of at least some of the brackets in a space between the sheets and securing the other portion of the brackets to the sheets.

20. The method of claim 14, including supporting the floor panel at a selected height above a floor surface, supporting the roof panel above the floor panel at a height corresponding to the length of the pillars extending between the panels, securing each pillar to the panels and then securing a plurality of side panels to the pillars.

21. The method of claim 14, including securing at least one vehicle component to the roof panel such that the roof panel bears the weight of the component.

22. The method of claims 14, including spacing a plurality of the pillars apart a selected distance and securing seats to the pillars by securing support brackets to the pillars and corresponding portions of the seats with one support bracket of one seat secured to a first portion of one pillar and one support bracket of an adjacent seat secured to a second portion of the one pillar.

23. A mass transit vehicle frame, comprising:

a stiff floor panel extending from a front to a rear of the frame;

a stiff roof panel positioned above the floor panel;

a plurality of pillars extending between the floor panel and the roof panel, the pillars being connected to the panels near ends of the pillars and near edges of the panels;

a plurality of side panels secured at least to the pillars, the side panels carrying shear loads on the frame;

connector brackets secured to the pillars near the ends of the pillars and secured to the corresponding floor or roof panel near the edge of the corresponding floor or roof panel, wherein the brackets each have a first support arm secured to the corresponding pillar and a second support arm generally perpendicular to the first support arm, the second support arm being secured to the corresponding panel and wherein the roof panel and the floor panel each include a sandwich construction of two outwardly facing sheets with a reinforcing member secured between the sheets and including at least four of the brackets associated with each end of the pillars, the second support arms of each bracket being secured to a corresponding one of the sheets.

24. The frame of claim 23, wherein at least one of the bracket second support arms is received at least partially between the sheets.

25. A mass transit vehicle frame, comprising:

a stiff floor panel extending from a front to a rear of the frame;

a stiff roof panel positioned above the floor panel;

a plurality of pillars extending between the floor panel and the roof panel, the pillars being connected to the panels near ends of the pillars and near edges of the panels and wherein the pillars are arranged parallel to each other and are spaced along a length of the frame at selected intervals;

a plurality of side panels secured at least to the pillars, the side panels carrying shear loads on the frame; and passenger seats having a front support member secured to a first one of the pillars and a rear support member secured to a second one of the pillars adjacent the first pillar.

26. The frame of claim 25, including at least one support bracket having a central portion secured to at least one of the front or rear support members, the support bracket including two wing portions extending away from the central portion, the wing portions being secured to the corresponding pillar near the end of the wing portions.

27. A method of making a frame for a mass transit vehicle, comprising the steps of:

positioning a stiff roof panel above a stiff floor panel wherein the roof panel and the floor panel each comprise a sandwich construction having two sheets with a reinforcing member between the sheets;

connecting a plurality of pillars to the roof panel and the floor panel near edges of the floor and roof panels and near ends of the pillars; and connecting a plurality of side panels to at least the pillars such that the side panels carry shear loads on the frame;

securing mounting brackets to the pillars near the ends of the pillars and securing another portion of the brackets to the corresponding one of the floor or roof panels; and inserting at least some of the other portion of at least some of the brackets in a space between the sheets and securing the other portion of the brackets to the sheets.

28. A method of making a frame for a mass transit vehicle, comprising the steps of:

positioning a stiff roof panel above a stiff floor panel;

connecting a plurality of pillars to the roof panel and the floor panel near edges of the floor and roof panels and near ends of the pillars including spacing a plurality of the pillars apart a selected distance;

connecting a plurality of side panels to at least the pillars such that the side panels carry shear loads on the frame; and securing seats to the pillars by securing support brackets to the pillars and corresponding portions of the seats with one support bracket of one seat secured to a first portion of one pillar and one support bracket of an adjacent seat secured to a second portion of the one pillar.

* * * * *

UNITED STATES PATENT AND TRADEMARK OFFICE
CERTIFICATE OF CORRECTION

PATENT NO. : 6,685,254 B2
DATED : February 3, 2004
INVENTOR(S) : Emmons et al.

It is certified that error appears in the above-identified patent and that said Letters Patent is hereby corrected as shown below:

<u>Column 1,</u>
Line 1, insert the following paragraph:
-- This invention was made with Government support under Contract Nos. 85XTA056V and 4000010114 funded by the Government. The Government has certain rights in the invention. --.

Signed and Sealed this

Sixteenth Day of May, 2006

JON W. DUDAS
*Director of the United States Patent and Trademark Office*